United States Patent
King et al.

(10) Patent No.: US 10,442,296 B2
(45) Date of Patent: Oct. 15, 2019

(54) VEHICLE PROPULSION SYSTEM WITH MULTI-CHANNEL DC BUS AND METHOD OF MANUFACTURING SAME

(71) Applicant: General Electric Company, Schenectady, NY (US)

(72) Inventors: Robert Dean King, Schenectady, NY (US); Zhihao Li, Rexford, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

(21) Appl. No.: 15/799,045

(22) Filed: Oct. 31, 2017

(65) Prior Publication Data

US 2018/0065491 A1  Mar. 8, 2018

Related U.S. Application Data

(63) Continuation of application No. 14/168,224, filed on Jan. 30, 2014, now Pat. No. 9,834,098.

(51) Int. Cl.
*H02P 1/00* (2006.01)
*H02P 3/00* (2006.01)
(Continued)

(52) U.S. Cl.
CPC .............. *B60L 11/1803* (2013.01); *B60L 7/14* (2013.01); *B60L 15/007* (2013.01);
(Continued)

(58) Field of Classification Search
CPC ....... B60L 11/1803; B60L 7/14; B60L 11/005
(Continued)

(56) References Cited

U.S. PATENT DOCUMENTS 7,063,637 B2   6/2006   Yamauchi et al.
7,207,915 B2   4/2007   Oshidari et al.
(Continued)

FOREIGN PATENT DOCUMENTS

CN   101729020 A   6/2010
DE   102006013502 A1   9/2007
(Continued)

OTHER PUBLICATIONS

Office Action issued in connection with corresponding CN Application No. 2015100501902 dated Mar. 27, 2018.
(Continued)

*Primary Examiner* — Erick D Glass
(74) *Attorney, Agent, or Firm* — Meagher Emanuel Laks Goldberg & Liao, LLP

(57) ABSTRACT

An apparatus includes a multi-channel DC bus assembly comprising a first channel and a second channel, a first electromechanical device coupled to a positive DC link of the first channel, and a second electromechanical device coupled to a positive DC link of the second channel. A first DC-to-AC voltage inverter is coupled to the positive DC link of the first channel and a second DC-to-AC voltage inverter is coupled to the positive DC link of the second channel. The apparatus further includes a bi-directional voltage modification assembly coupled to the positive DC link of the second channel and a first energy storage system electrically coupled to the first electromechanical device.

20 Claims, 7 Drawing Sheets

(51) Int. Cl.
| | |
|---|---|
| *H02P 5/00* | (2016.01) |
| *B60L 11/18* | (2006.01) |
| *B60L 7/14* | (2006.01) |
| *B60L 15/00* | (2006.01) |
| *B60L 15/20* | (2006.01) |
| *B60L 50/40* | (2019.01) |
| *B60L 50/16* | (2019.01) |
| *B60L 50/51* | (2019.01) |
| *B60L 58/18* | (2019.01) |
| *B60L 58/21* | (2019.01) |
| *B60L 58/20* | (2019.01) |

(52) U.S. Cl.
CPC ........... *B60L 15/2045* (2013.01); *B60L 50/16* (2019.02); *B60L 50/40* (2019.02); *B60L 50/51* (2019.02); *B60L 58/18* (2019.02); *B60L 58/20* (2019.02); *B60L 58/21* (2019.02); *B60L 2210/12* (2013.01); *B60L 2210/14* (2013.01); *B60L 2210/40* (2013.01); *Y02T 10/645* (2013.01); *Y02T 10/70* (2013.01); *Y02T 10/7005* (2013.01); *Y02T 10/7022* (2013.01); *Y02T 10/7061* (2013.01); *Y02T 10/7066* (2013.01); *Y02T 10/7077* (2013.01); *Y02T 10/7225* (2013.01); *Y02T 10/7233* (2013.01); *Y02T 10/7241* (2013.01); *Y02T 10/7283* (2013.01); *Y10T 29/49117* (2015.01)

(58) Field of Classification Search
USPC ........................................................ 318/139
See application file for complete search history.

(56) References Cited

U.S. PATENT DOCUMENTS

| | | | |
|---|---|---|---|
| 7,246,672 | B2 | 7/2007 | Shirai et al. |
| 7,932,633 | B2 | 4/2011 | King et al. |
| 8,026,638 | B2 | 9/2011 | King et al. |
| 8,387,730 | B2 | 3/2013 | Bouchon |
| 8,535,200 | B2 | 9/2013 | Vyas et al. |
| 9,561,719 | B2 | 2/2017 | Lo et al. |
| 2003/0150352 | A1 | 8/2003 | Kumar |
| 2004/0069548 | A1 | 4/2004 | Kira et al. |
| 2005/0082992 | A1 | 4/2005 | Aizawa et al. |
| 2006/0169548 | A1 | 8/2006 | Corbett et al. |
| 2006/0250902 | A1* | 11/2006 | Bender ............... B60K 6/46 369/1 |
| 2007/0007939 | A1* | 1/2007 | Miller ................. B60K 6/26 323/299 |
| 2007/0158118 | A1 | 7/2007 | King |
| 2008/0011528 | A1 | 1/2008 | Verbrugge |
| 2010/0136379 | A1 | 6/2010 | King |
| 2010/0194318 | A1 | 8/2010 | Aso |
| 2010/0219794 | A1 | 9/2010 | Sugimoto et al. |
| 2010/0222953 | A1 | 9/2010 | Tang |
| 2011/0101915 | A1 | 5/2011 | Mitsutani |
| 2012/0103749 | A1 | 5/2012 | Kimura et al. |
| 2013/0030630 | A1 | 1/2013 | Luke et al. |
| 2013/0038127 | A1 | 2/2013 | King |
| 2013/0138279 | A1 | 5/2013 | Shi |
| 2013/0311023 | A1* | 11/2013 | Nozaki ................ B60K 6/365 701/22 |
| 2014/0077737 | A1 | 3/2014 | Zhang et al. |

FOREIGN PATENT DOCUMENTS

| | | |
|---|---|---|
| EP | 1306262 A2 | 5/2003 |
| EP | 1810861 A1 | 7/2007 |
| EP | 2159898 A1 | 3/2010 |
| EP | 2340957 A1 | 7/2011 |
| EP | 2502773 A2 | 9/2012 |
| EP | 2587618 A2 | 5/2013 |
| EP | 2639099 A | 9/2013 |
| JP | H5-176411 A | 12/1991 |
| JP | 2003-244801 A | 8/2003 |
| JP | 2004-260904 A | 9/2004 |
| JP | 2005-143274 A | 6/2005 |
| JP | 2006-042510 B | 2/2006 |
| JP | 2006-230071 A | 8/2006 |
| JP | 2009-522167 A | 12/2006 |
| JP | 2007-174867 A | 7/2007 |
| JP | 2007274785 A | 10/2007 |
| JP | 2008005625 A | 1/2008 |
| JP | 2008-312382 A | 12/2008 |
| JP | 2008312380 A | 12/2008 |
| JP | 2009148139 A | 7/2009 |
| JP | 2009183108 A | 8/2009 |
| JP | 2013188106 A | 9/2013 |
| KR | 2013-0063893 A | 6/2013 |
| WO | 2007107458 A2 | 9/2007 |
| WO | 2013/008328 A1 | 1/2013 |
| WO | 2013024675 A1 | 2/2013 |

OTHER PUBLICATIONS

European Search Report and Opinion issued in connection with corresponding EP Application No. 15152810.6 dated Oct. 22, 2015.
Office Action for corresponding KR Application No. 10-2015-0116684 dated Feb. 27, 2018.
Summons for corresponding EP Application No. 15152810.6 dated Jun. 4, 2018.
Notification of Reasons for Refusal for corresponding JP Application No. 2015-009031 dated Dec. 28, 2018.
Search Report for corresponding JP Application N.: 2015-009031 dated Dec. 18, 2018.
Notice of Allowance issued in connection with corresponding KR Application No. 1020150009219 dated Sep. 21, 2018.

* cited by examiner

VEHICLE PROPULSION SYSTEM WITH MULTI-CHANNEL DC BUS AND METHOD OF MANUFACTURING SAME

BACKGROUND OF THE INVENTION

Embodiments of the invention relate generally to electric drive systems including hybrid and electric vehicles and, more particularly, to transferring energy between one or more energy storage devices and multiple electromechanical devices of the vehicle using a multi-channel DC bus.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy while a second source of stored electrical energy may be used to provide higher-power energy for, for example, acceleration.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

While propulsion system configurations for purely electric vehicles and hybrid electric vehicles have been developed to include multiple sources of electrical energy to increase energy or power density and multiple power sources to achieve desired propulsive output, incorporating these energy storage and power sources into a propulsion system increases the overall size, weight, and cost of the system. Further, the limitations imposed by configuring a propulsion system to operate with multiple power sources in combination with one or more energy storage sources reduces the operating efficiency and fuel economy of the individual components of the propulsion system in addition to reducing the overall system efficiency.

Therefore, it would be desirable to provide an electric and/or hybrid electric propulsion system that incorporates multiple electromechanical devices and one or more energy storage systems in a manner that improves overall system efficiency and permits the individual components of the propulsion system to be operated independently to improve the individual operating efficiencies thereof.

BRIEF DESCRIPTION OF THE INVENTION

According to one aspect of the invention, an apparatus includes a multi-channel DC bus assembly comprising a first channel and a second channel, a first electromechanical device coupled to a positive DC link of the first channel, and a second electromechanical device coupled to a positive DC link of the second channel. A first DC-to-AC voltage inverter is coupled to the positive DC link of the first channel and a second DC-to-AC voltage inverter is coupled to the positive DC link of the second channel. The apparatus further includes a bi-directional voltage modification assembly coupled to the positive DC link of the second channel and a first energy storage system electrically coupled to the first electromechanical device.

In accordance with another aspect of the invention, a method of fabricating a propulsion system includes coupling a first DC-to-AC voltage inverter to a first voltage bus, coupling a first electromechanical device to the first DC-to-AC voltage inverter, and coupling a second DC-to-AC voltage inverter to a second voltage bus. The method also includes coupling a second electromechanical device to the second. DC-to-AC voltage inverter, coupling a bi-directional DC-DC voltage converter to the second voltage bus, coupling a first energy storage system to the bi-directional DC-DC voltage converter, and programming a controller to control switching of the bi-directional DC-DC voltage converter to boost a voltage of the first energy storage system to a boosted voltage different from a voltage of the first voltage bus.

In accordance with yet another aspect of the invention, a vehicle propulsion system includes a DC bus assembly having a first DC bus and a second DC bus. The vehicle propulsion system also includes a first bi-directional DC-to-DC voltage converter coupled to the first DC bus, a high specific-power energy storage device coupled to a low voltage side of the first bi-directional DC-to-DC voltage converter, a first electromechanical device coupled to the first DC bus through a first DC-to-AC voltage converter, and a second electromechanical device coupled to the second DC bus through a second DC-to-AC voltage converter. A controller is programmed to control the first bi-directional DC-to-DC voltage converter to boost a voltage of the first electromechanical device to a boosted voltage and supply the boosted voltage to the first DC bus, the boosted voltage different than a voltage of the second DC bus.

In accordance with yet another aspect of the invention, a vehicle propulsion system includes a first electromechanical device coupled to a positive DC link of a first DC bus, an auxiliary load coupled to an output of the first electromechanical device and a first DC-to-AC voltage inverter coupled to the positive DC link of the first DC bus. A second electromechanical device is coupled to a positive DC link of a second DC bus and a transmission is coupled to an output of the second electromechanical device. The vehicle propulsion system also includes a second DC-to-AC voltage inverter coupled to the positive DC link of the second DC bus, an energy storage system electrically coupled to the positive DC link of the second DC bus, and a bi-directional voltage modification assembly coupled to the positive DC link of the second DC bus and configured to boost a voltage of the first energy storage system to a voltage different from a voltage of the first DC bus.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
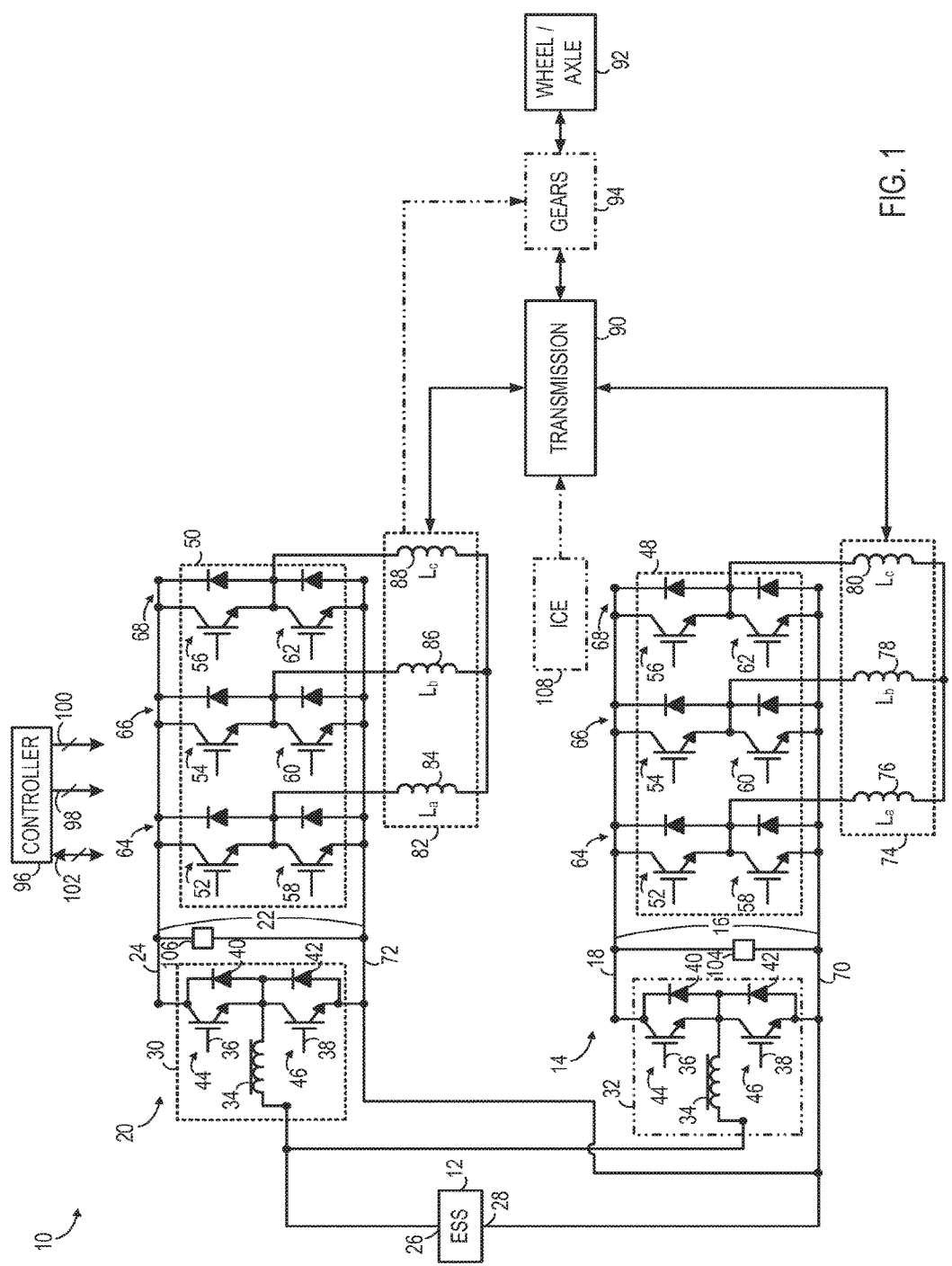
FIG. 1 is a schematic diagram of a propulsion system according to an embodiment of the invention.

FIG. 1 is a schematic diagram of a propulsion system 10 according to an embodiment of the invention. As described in detail below, propulsion system 10 may be configured in a pure electric (EV) propulsion system arrangement that splits power output between two or more electromechanical devices or as a hybrid (HEV) propulsion system that includes an internal combustion engine in addition to multiple electromechanical devices. In either an EV or HEV embodiment, the electromechanical devices are provided on independent channels of a multi-channel DC bus, permitting flexibility in the sizing and operation of the multiple electromechanical devices and increasing the operating efficiency of the electromechanical devices and overall propulsion system.

According to various embodiments, propulsion system 10 is configured to be incorporated into various types of vehicles including, but not limited to, automobiles, busses, trucks, tractors, mining equipment, marine craft, and off-road vehicles, including material transport vehicles or personal carrier vehicles, capable of operation both on the surface and underground such as in mining operations, or other type of electrical apparatus such as, for example, a crane, elevator, or lift, as non-limiting examples.

Propulsion system 10 includes an energy storage system 12 and a multi-channel DC bus arrangement having at least two or more independent DC bus channels. In the embodiment illustrated in FIG. 1, the multi-channel DC bus arrangement includes two channels: an A channel 14 comprising an A channel DC bus 16 having an A channel positive DC link 18 and a B channel 20 comprising a B channel DC bus 22 having a B channel positive DC link 24. Energy storage system 12 includes a positive terminal 26 and a negative terminal 28. In one embodiment, energy storage system 12 is a high-voltage or high-power energy storage device and may be a battery, a flywheel system, fuel cell, an ultracapacitor, or a combination of ultracapacitors, fuel cells, and/or batteries, as examples. A positive terminal 26 of energy storage system 12 is coupled to a first bi-directional DC-DC voltage converter assembly 30. In one embodiment, positive terminal 26 of energy storage system 12 is also coupled to an optional second bi-directional DC-DC voltage converter assembly 32 (shown in phantom). As shown, first bi-directional DC-DC voltage converter 30 is coupled to the B channel positive DC link 24 whereas second bi-directional DC-DC voltage converter assembly 32 is coupled to the A channel positive DC link 18. According to one embodiment, energy storage system 12 is sized such that second bi-directional DC-DC voltage converter assembly 32 may be omitted from A channel 14 resulting in a propulsion system 10 that includes fewer parts and less weight than a system that includes a respective DC-DC voltage converter on each channel of the multi-channel DC bus assembly.

Both first bi-directional DC-DC voltage converter 30 and second bi-directional DC-DC voltage converter assembly 32, when used, are configured to convert one DC voltage to another DC voltage either by bucking or boosting the DC voltage. Each bi-directional DC-to-DC voltage converter 30, 32 includes an inductor 34 coupled to a pair of switches 36, 38 and coupled to a pair of diodes 40, 42. Each switch 36, 38 is coupled to a respective diode 40, 42, and each switch/diode pair forms a respective half phase module 44, 46. Switches 36, 38 are shown, for illustrative purposes, as insulated gate bipolar transistors (IGBTs). However, embodiments of the invention are not limited to IGBT's. Any appropriate electronic switch can be used, such as, for example, metal oxide semiconductor field effect transistors (MOSFETs), silicon carbide (SiC) MOSFETs, Gallium nitride (GaN) devices, bipolar junction transistors (BJTs), and metal oxide semiconductor controlled thyristors (MCTs).

The A channel 14 and B channel 20 also include respective DC-to-AC voltage inverters 48, 50, each of which includes six half phase modules 52, 54, 56, 58, 60, and 62 that are paired to form three phases 64, 66, 68. Each phase 64, 66, 68 is coupled between a pair of conductors of its respective DC bus 22, 16. Specifically, each phase 64, 66, 68 of DC-to-AC voltage inverter 48 is coupled between A channel positive DC link 18 and an A channel negative DC link 70 of A channel DC bus 16 and each phase 64, 66, 68 of DC-to-AC voltage inverter 50 is coupled between B channel positive DC link 24 and a B channel negative DC link 72 of B channel DC bus 22.

An electromechanical device 74 is coupled to DC-to-AC voltage inverter 48 on A channel 14. Electromechanical device 74 includes a plurality of windings 76, 78, 80 coupled to respective phases 64-68 of DC-to-AC voltage inverter 48. Propulsion system 10 also includes an electromechanical device 82 coupled to DC-to-AC voltage inverter 50 on the B channel 20. As shown, electromechanical device 82 includes a plurality of windings 84, 86, 88 coupled to respective phases 64-68 of DC-to-AC voltage inverter 50. In one embodiment, electromechanical device 82 is a traction motor and electromechanical device 74 is either an alternator or a traction motor. Although the propulsion system 10 illustrated in FIG. 1 includes three-phase inverters 48, 50 and three-phase electromechanical devices 74, 84, it is contemplated that propulsion system 10 may utilize any number of phases in alternative embodiments.

According to one embodiment, electromechanical device 82 and associated DC-to-AC voltage inverter 50 are sized to provide and accept high power levels and operate at higher speeds than electromechanical device 74 and associated DC-to-AC voltage inverter 48. To minimize system losses, especially during high speed, high power operation, the DC link voltage of B channel 20 may be decoupled from the voltage of energy storage system 12 and may be controlled to be at a higher voltage than the DC link voltage of A channel 14. As one non-limiting example, electromechanical device 74 may be designed for a DC link voltage of approximately 400 V, with DC-to-AC voltage inverter 48 having switching devices rated for approximately 650 V, while electromechanical device 82 is designed to operate at a boosted DC link voltage of approximately 630 V, with DC-to-AC voltage inverter 50 having switching devices rated for 900 V or 1200 V or possibly higher voltage of 1800 V. In addition, because the DC link voltage of the B channel is decoupled from the DC link voltage of the A channel, the operation of DC-to-AC voltage inverter 48 and excitation of electromechanical device 74 may further be optimized to achieve desired operating characteristics.

Propulsion system 10 also includes a transmission 90 coupled to the outputs of electromechanical device 74 and electromechanical device 82. Transmission 90 is constructed as a gear assembly, belt assembly, or combination thereof according to various embodiments. According to one embodiment, transmission 90 is configured as an electrically variable transmission (EVT) that couples the outputs of electromechanical devices 74, 82 through an arrangement of planetary gears and clutches (not shown). In operation, electromechanical devices 74, 82 may be operated over a wide range of bi-directional speed, torque, and power commands to minimize power loss and maintain a high degree of overall system efficiency while operating in either a charge depleting (CD) or charge sustaining (CS) mode of operation.

The output of transmission 90 is coupled to one or more driving wheels or axles 92 of a vehicle (not shown) through a gear assembly 94, which may include a differential. Depending on how the clutches of transmission 90 are configured, electromechanical device 82 may be coupled to gear assembly 94 through transmission 90 or may be directly coupled to gear assembly 94 such that the output of electromechanical device 82 bypasses transmission 90.

Propulsion system 10 also includes a controller 96 operably coupled to half phase modules 44, 46 of bi-directional DC-DC voltage converters 30, 32 by control lines 98. Through appropriate control of switches 36, 38 of voltage converters 30, 32, controller 96 is configured to boost a voltage of energy storage system 12 to a higher voltage and to supply the higher voltage to A channel DC bus 16. Likewise, controller 96 is configured to control switching of bi-directional DC-DC voltage converter 32 to boost the voltage of energy storage system 12 to a higher voltage and to supply the higher voltage to B channel DC bus 22. In some modes of operation, DC bus 22 may operate at a higher voltage than DC bus 16. In other modes, DC bus 16 and DC bus 22 may be operated at the same voltage. Controller 96 is also configured to control switches 36, 38 of respective voltage converters 30, 32 to buck a voltage of A channel DC bus 16 and B channel DC bus 22 and to supply the bucked voltages to energy storage system 12.

Controller 96 is also coupled to half phase modules 52-62 of inverters 48, 50 by control lines 100. Controller 96, through appropriate control of half phase modules 52-62 in a motoring mode, is configured to control inverters 48, 50 to convert the DC voltage or current on respective DC buses 16, 22 to an AC voltage or current for supply to windings 74-80, 84-88 of respective electromechanical devices 74, 82. In a regenerative mode, controller 96 is configured to control half phase modules 52-62 to invert an AC voltage or current received by respective inverters 48, 50 from its corresponding electromechanical device 74, 82 into a DC voltage or current to supply to A channel DC bus 16 or B channel DC bus 22.

In operation, controller 96 receives feedback from a number of sensors provided within propulsion system 10 via control lines 102. For example, voltage sensors 104, 106 may be provided on the A channel DC bus 16 and the B channel DC bus 22, respectively, to allow controller 96 to monitor the bus voltage of the A and B channels 14, 20. As one skilled in the art will recognize, additional voltage and/or current sensors may be provided throughout propulsion system 10 to permit controller 96 to monitor other operating conditions, such as, for example, the charging voltage of energy storage system 12. In addition, one skilled in the art will recognize that controller 96 may receive feedback from and/or transmit control commands to other components within propulsion system 10, such as, for example, internal combustion engine 108.

According to one embodiment propulsion system 10 is configured as a pure electric vehicle (EV) propulsion system. Alternatively, propulsion system 10 is configured in a hybrid electric vehicle (HEV) propulsion system and also includes an internal combustion engine 108 (shown in phantom) coupled to transmission 90. According to various embodiments, internal combustion engine 108 may be an internal combustion gasoline engine, an internal combustion diesel engine, an internal combustion engine fueled by natural gas, an external combustion engine, or a gas turbine engine, as examples.

Figure 2:
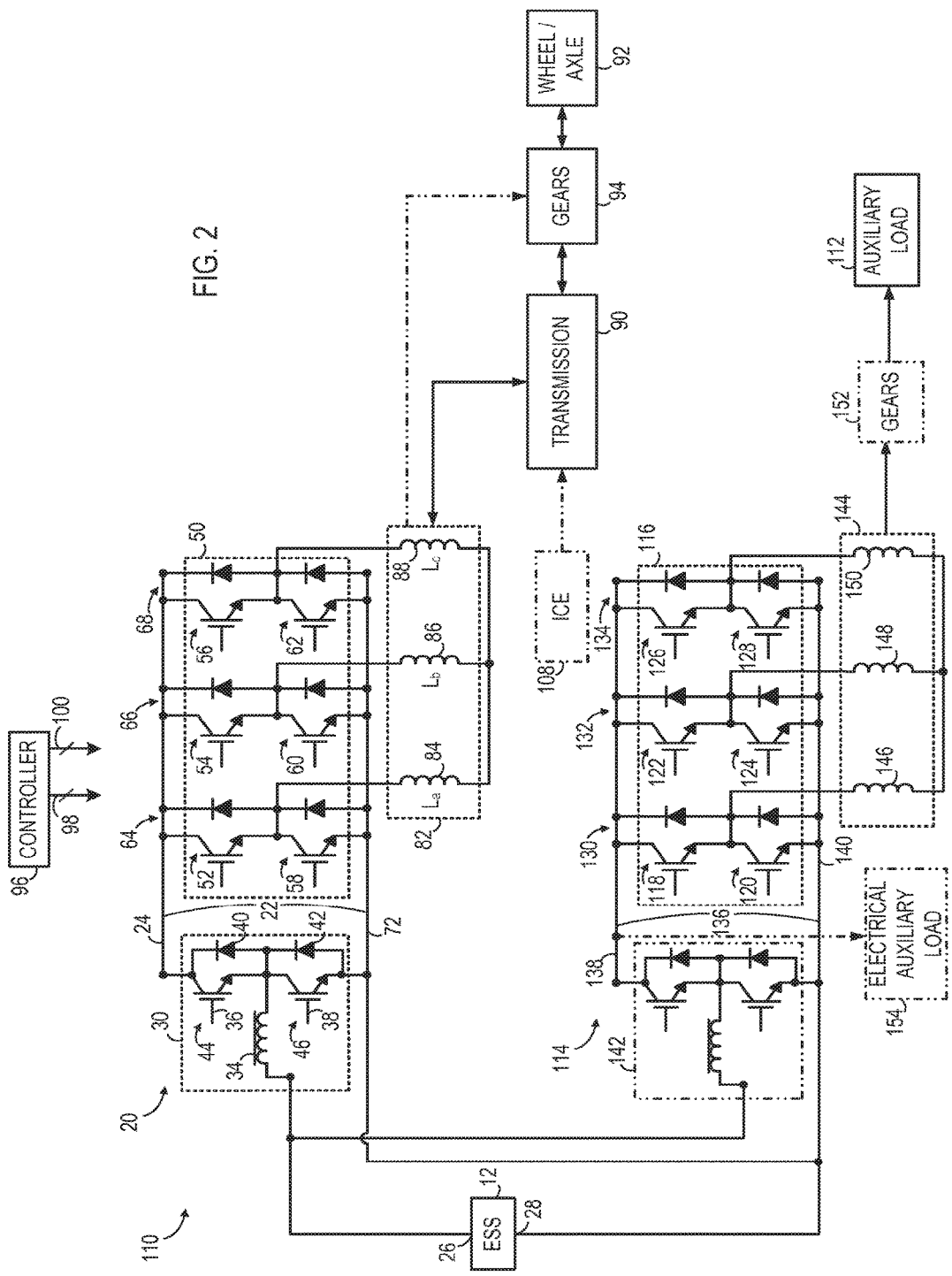
FIG. 2 is a schematic diagram of a propulsion system that includes an auxiliary load according to an embodiment of the invention.

Referring now to FIG. 2, a dual-channel propulsion system 110 is illustrated according to an alternative embodiment that includes a vehicle accessory load or auxiliary load 112. Elements and components common to propulsion system 10 and propulsion system 110 are referred to herein with similar part numbering. Similar to propulsion system 10, propulsion system 110 includes an electromechanical device 82 coupled to the B channel 20 through DC-to-AC voltage inverter 50. Propulsion system 110 also includes a bi-directional DC-DC voltage converter 30 configured to selectively boost a voltage of energy storage system 12 to a bus voltage of B channel DC bus 22 during a motoring mode and buck a voltage B channel DC bus 22 to a voltage of energy storage system 12 during a regenerative or recharging mode.

In addition to B channel 20, the dual-channel DC bus assembly of propulsion system 110 includes a second channel or C channel 114 that is connected to an auxiliary load 112 through a DC-to-AC voltage inverter 116, which like DC-to-AC voltage inverter 50, includes six half phase modules 118, 120, 122, 124, 126, 128 paired to form respective phases 130, 132, 134. As illustrated in FIG. 2, C channel 114 includes a C channel DC bus 136 having a C channel positive DC link 138 coupled to the positive terminal 26 of energy storage system 12 through an optional DC-DC converter 142 (shown in phantom) and a C channel negative DC bus 140 coupled to the negative terminal 28 of energy storage system 12.

In one embodiment, energy storage system 12 is sized such that positive terminal 26 of energy storage system 12 may be directly coupled to C channel DC bus 136. Alternatively, an optional bi-directional DC-DC voltage converter 142 (shown in phantom), similar to bi-directional DC-DC voltage converter 30 (FIG. 1), is coupled to the C channel DC bus 136.

The auxiliary load 112 of propulsion system 110 is coupled to an electromechanical device 144 having a plurality of windings 146, 148, 150, which are coupled to respective phases 130, 132, 134 of DC-to-AC voltage inverter 116. Auxiliary load may be a pump, heater, cooling fan, electrically powered air conditioning unit a pneumatic or other fluid compressor unit, as non-limiting examples. In a direct-drive embodiment, electromechanical device 144 is directly coupled to auxiliary load 112. In alternative embodiments including a gear or belt-driven device such as, for example, a high speed motor running a pump, electromechanical device 144 may be coupled to auxiliary load 112 via an optional gear or belt assembly component 152 (shown in phantom).

Optionally, propulsion system 110 may include one or more electrical auxiliary loads 154 (shown in phantom) coupled to the C channel positive and negative DC links 138, 140. According to an exemplary embodiment, electrical auxiliary load(s) 154 may include high-power electrical loads such as, for example, resistive heating elements.

Figure 3:
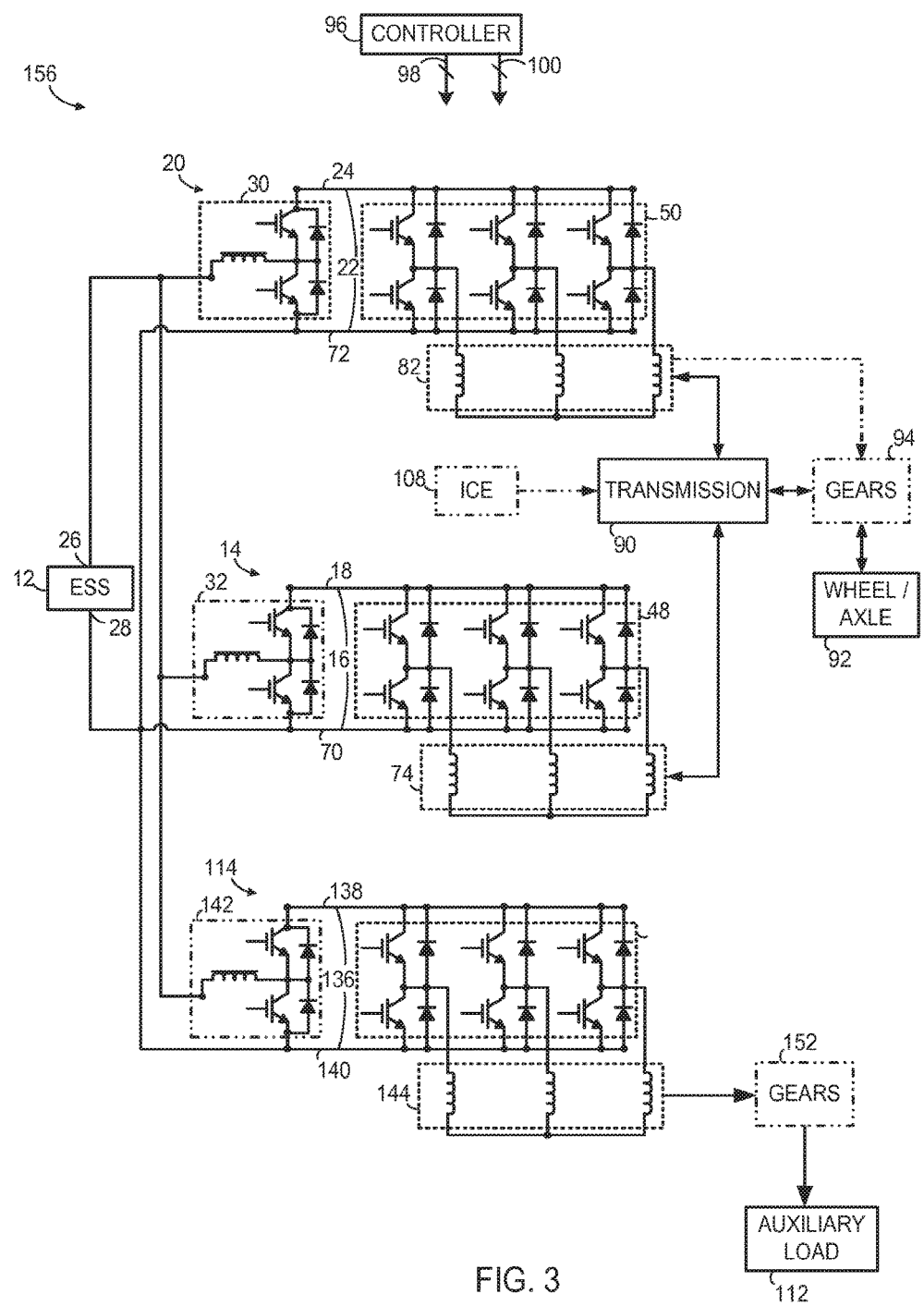
FIG. 3 is a schematic diagram of a propulsion system that includes an auxiliary load according to another embodiment of the invention.

Propulsion system 10 (FIG. 1) and propulsion system 110 (FIG. 2) are described above as including two channels, an A channel 14 and B channel 20 both coupled to a transmission 90 in the case of propulsion system 10 and an A channel 14 coupled to a transmission 90 and a C channel 114 coupled to an auxiliary load 112 in the case of propulsion system 110. Alternative embodiments may include more than two DC bus channels, with two or more channels coupled to the vehicle transmission and one or more DC bus channels coupled to auxiliary loads. As one example, the propulsion system 156 of FIG. 3 includes A channel 14 and B channel 20 coupled to transmission 90 via respective electromechanical devices 74, 82 and C channel 114 coupled to auxiliary load 112 via electromechanical device 144. In the embodiment shown, the positive DC links 18, 24, 138 of each channel are coupled to the positive terminal 26 of energy storage system 12. As described with respect to FIGS. 1 and 2, bi-directional DC-DC voltage converter assembly 32 of A channel 14 and/or bi-directional DC-DC voltage converter 142 of C channel DC bus 136 are optional components and may be omitted based on the sizing of energy storage system 12.

Figure 4:
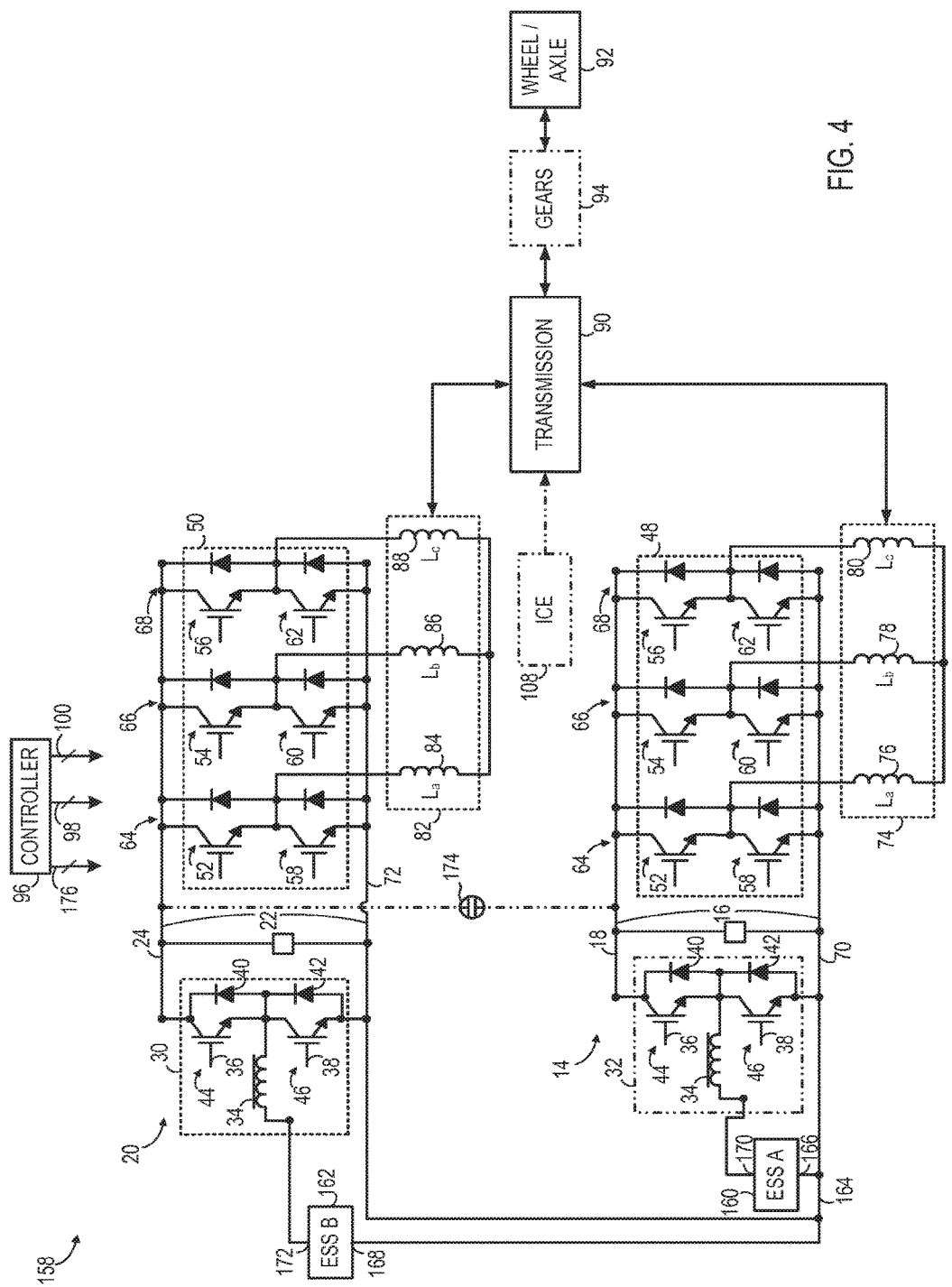
FIG. 4 is a schematic diagram of a propulsion system according to another embodiment of the invention.

FIG. 4 is a schematic diagram of a propulsion system 158 according to another embodiment of the invention. Elements and components common to propulsion systems 10 and 158 will be discussed relative to the same reference numbers as appropriate. In addition to the components common with propulsion system 10, propulsion system 158 differs from propulsion system 10 in that it includes a first energy storage system 160 and a second energy storage system 162 instead of the single energy storage system 12 of FIG. 1.

As shown in FIG. 4, first and second energy storage systems 160, 162 are connected by a common negative DC link 164 coupled to the respective negative terminals 166, 168 of the energy storage systems 160, 162. The positive terminal 170 of first energy storage system 160 is coupled to the A channel positive DC link 18 through DC-DC converter 32 and the positive terminal 172 of second energy storage system 162 is coupled to the B channel positive DC link 24 through DC-DC converter 30.

According to one embodiment, first energy storage system 160 is a high specific-power energy storage device and second energy storage system 162 is a high specific-energy storage device. First energy storage system 160 may be, for example, an ultracapacitor having multiple capacitor cells coupled to one another, where the capacitor cells may each have a capacitance that is greater than approximately 500 Farads. Alternatively, first energy storage system 160 may be a high power battery having a specific-power of approximately 350 W/kg or greater or a combination of one or more ultracapacitors and batteries. In embodiments where first energy storage system 160 is au ultracapacitor, first bi-directional DC-DC voltage converter 32 is included on the A channel 14. Alternatively, where first energy storage system 160 is a battery, optional first bi-directional DC-DC voltage converter 32 (shown in phantom) may optionally be omitted based on the sizing of first energy storage system 160.

Second energy storage system 162 has a relatively low specific power as compared with first energy storage system 160. As used herein, low specific power describes an energy storage device demonstrated to achieve a specific power on the order of approximately 200 W/kg or lower. According to various embodiments, second energy storage system 162 may be, for example, a high specific energy battery or high energy density battery. The term energy battery used herein describes a high specific energy battery or high energy density battery demonstrated to achieve an energy density on the order of 100 W-hr/kg or greater (e.g., a Li-ion, sodium-metal halide, sodium nickel chloride, sodium-sulfur, Li-Air, or zinc-air battery).

In one embodiment, second energy storage system 162 has a relatively high resistivity and impedance as compared with first energy storage system 160. In another embodiment, the relatively low specific, power of second energy storage system 162 may be due to an imbalance of the individual battery cells comprising the energy storage system. In one embodiment, second energy storage system 162 is a low-cost lithium ion battery. Alternatively, second energy storage system 162 may be a sodium metal halide battery, a sodium sulfur battery, a nickel metal halide battery, a Zinc-air battery, a lead acid battery, and the like.

In embodiments where first energy storage system 160 is configured as a power battery, propulsion system 158 may be incorporated into a transit bus, as an example. In yet another embodiment, first and second energy storage systems 160, 162 are both configured as high specific-energy storage devices.

By configuring propulsion system 158 with a separate energy storage system for each channel of the multi-channel DC bus assembly (e.g., first energy storage system 160 for the A channel 14 and second energy storage system 162 for the B channel 20), the energy storage systems 160, 162 may be individually sized for its respective channel to minimize the size, weight, and cost of the overall propulsion system 158 and account for the differing roles that the electromechanical devices 74, 82 may play in the propulsion system 158. For example, electromechanical device 74 may be operated to provide high power during acceleration periods whereas electromechanical device 82 may be operated to provide a longer-lasting power to the vehicle to increase a traveling distance thereof. Accordingly, because the peak power of the A channel 14 may be two or more times greater than the peak power of B channel 20, the first and second energy storage systems 160, 162 may be individually sized accordingly.

Control over the DC link voltage for each respective channel is provided by the respective bi-directional DC-DC voltage converter 30, 32. In addition, propulsion system 158 may be controlled to further optimize efficiency and cost while meeting peak power demands during operation and managing usable energy from first and second energy storage systems 160, 162 for various vehicle drive cycles. The inclusion of separate first and second energy storage systems 160, 162 may also lead to additional savings in the power electronics and passive components included the first and/or second bi-directional DC-DC voltage converters 30, 32 as well as the power electronic modules and passive components in one or both of the energy storage systems 160, 162. In addition, the inclusion of a separate energy storage system for each channel may result in improved operating efficiency by permitting the one or more of the energy storage systems 160, 162 to be operated at a lower voltage than a system that includes a single energy storage system sized to meet the peak power demands of multiple channels, such as energy storage system 12 of FIG. 1 that is sized to meet the peak power demand of both the A and B channels 14, 20.

Optionally, propulsion system 158 includes a switching element or coupling device 174 (shown in phantom) positioned between the positive DC links 18, 24 of A channel 14 and B channel 20. According to various embodiments, coupling device 174 may be constructed as an electromechanical switching device, a solid-state type switching device, a diode, a combination of a resistor and a contactor or solid-state switch, as non-limiting examples. Controller 96 is connected to coupling device 174 via control lines 176 and operates coupling device 174 in an open state or a closed state so that the A and B channels 14, 20 may be operated at different DC link voltages during certain modes of operation and selectively coupled together to operate at the same DC link voltage during other operating modes. For example, during a motoring mode of operation, coupling device 174 may be configured in an open state to permit the A channel 14 to operate at a lower DC link voltage than the B channel 20 so that electromechanical device 82 can nm efficiently at a higher operating voltage than electromechanical device 74. In addition, during a regenerative braking event or during an engine recharging event of one of the energy storage systems 162, 160, controller 96 may be configured to close coupling device 174 such that AC voltage or current generated by electromechanical device 74, inverted into a DC voltage or current by DC-to-AC voltage inverter 48 and supplied to second bi-directional DC-DC voltage converter assembly 30 to recharge second energy storage system 162.

Figure 5:
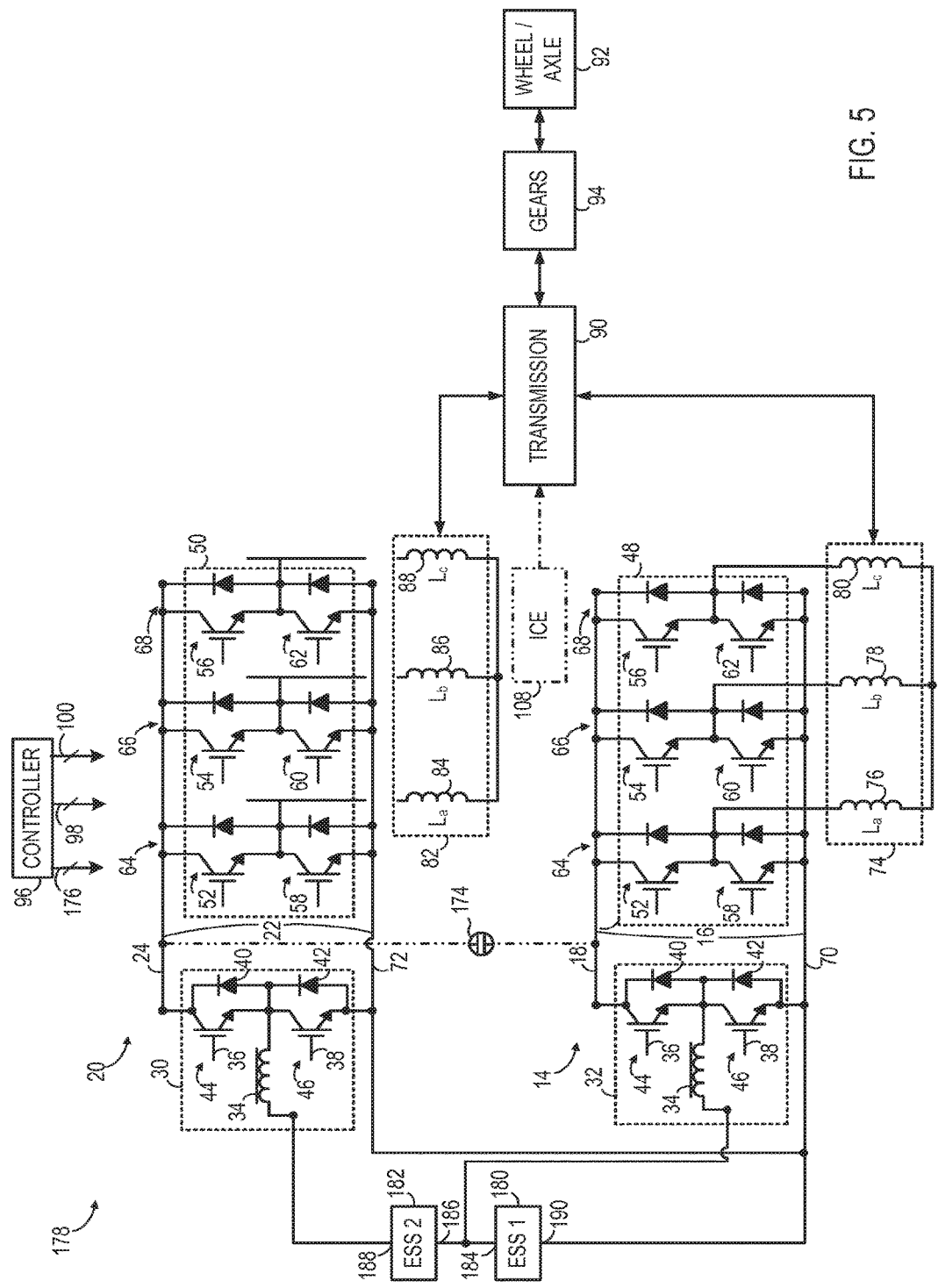
FIG. 5 is a schematic diagram of a propulsion system according to yet another embodiment of the invention.

Referring now to FIG. 5, a propulsion system 178 is illustrated according to another embodiment of the invention. Elements and components of propulsion system 178 common to propulsion systems 10, 158 will be discussed relative to the same reference numbers as appropriate.

Similar to propulsion system 158 of FIG. 4, propulsion system 178 includes a first energy storage system 180 and a second energy storage system 182, which may be individually sized based on the peak power demand of its respective channel 14, 20 thereby permitting a reduction in the size, overall weight, and cost of the propulsion system. In addition, first energy storage system 180 may be selected to have a higher specific power (and lower internal impedance) than second energy storage system 182, which may be sized for a higher nominal voltage than first energy storage system 180. Accordingly, in one embodiment, first energy storage system 180 is configured as a high specific-power energy storage device similar to first energy storage system 160 (FIG. 4) and second energy storage system 182 is configured as a high specific-energy storage device similar to second energy storage system 162 (FIG. 4).

Unlike the configuration of propulsion system 158 of FIG. 4, however, first energy storage system 180 and second energy storage system 182 of propulsion system 178 are arranged in a series configuration, as shown in FIG. 5, with the positive terminal 184 of first energy storage system 180 coupled to the negative terminal 186 of second energy storage system 182. As shown, the positive terminal 188 of second energy storage system 182 is connected to first bi-directional DC-DC voltage converter 30 and the negative terminal 190 of first energy storage system 180 is connected to A channel negative DC link 70 and also connected to B channel negative DC link 72. By connecting first and second energy storage systems 180, 182 in series, the power sharing between energy storage systems 180, 182 is a function of the relative voltages of the two energy storage systems. In other words, the power out of each energy storage system 180, 182 is a function of the voltage of the respective energy storage system 180, 182 as a result of the series configuration. Because the series connection of energy storage systems 180, 182 allows the relative voltages of the two systems to be summed, energy storage systems 180, 182 may be sized to have lower voltages than a propulsion system with a single energy storage system with a comparable overall voltage output, such as that shown in FIG. 1.

In operation, the state of charge (SOC) of both first energy storage system 180 and second energy storage system 182 is maintained within prescribed thresholds and within a prescribed operating range via the switching commands that the controller 96 transmits to the first and second bi-directional DC-DC voltage converter 30, 32. Independent control over the DC link voltages of the A channel 14 and B channel 20 are provided by bi-directional DC-DC voltage converter 30, 32 and associated loads from DC-to-AC voltage inverters 48, 50 and electromechanical devices 74, 82.

Optionally, propulsion system 178 may also include optional coupling device coupling device 174 (shown in phantom) positioned between the positive DC links 18, 24 of A channel 14 and B channel 20. Coupling device 174 may be operated by controller 96 in a similar manner in propulsion system 178 as described above with respect to propulsion system 158, so that the DC link voltages of the A and B channels 14, 20 are the same during certain modes of operation and differ during other operating modes.

Figure 6:
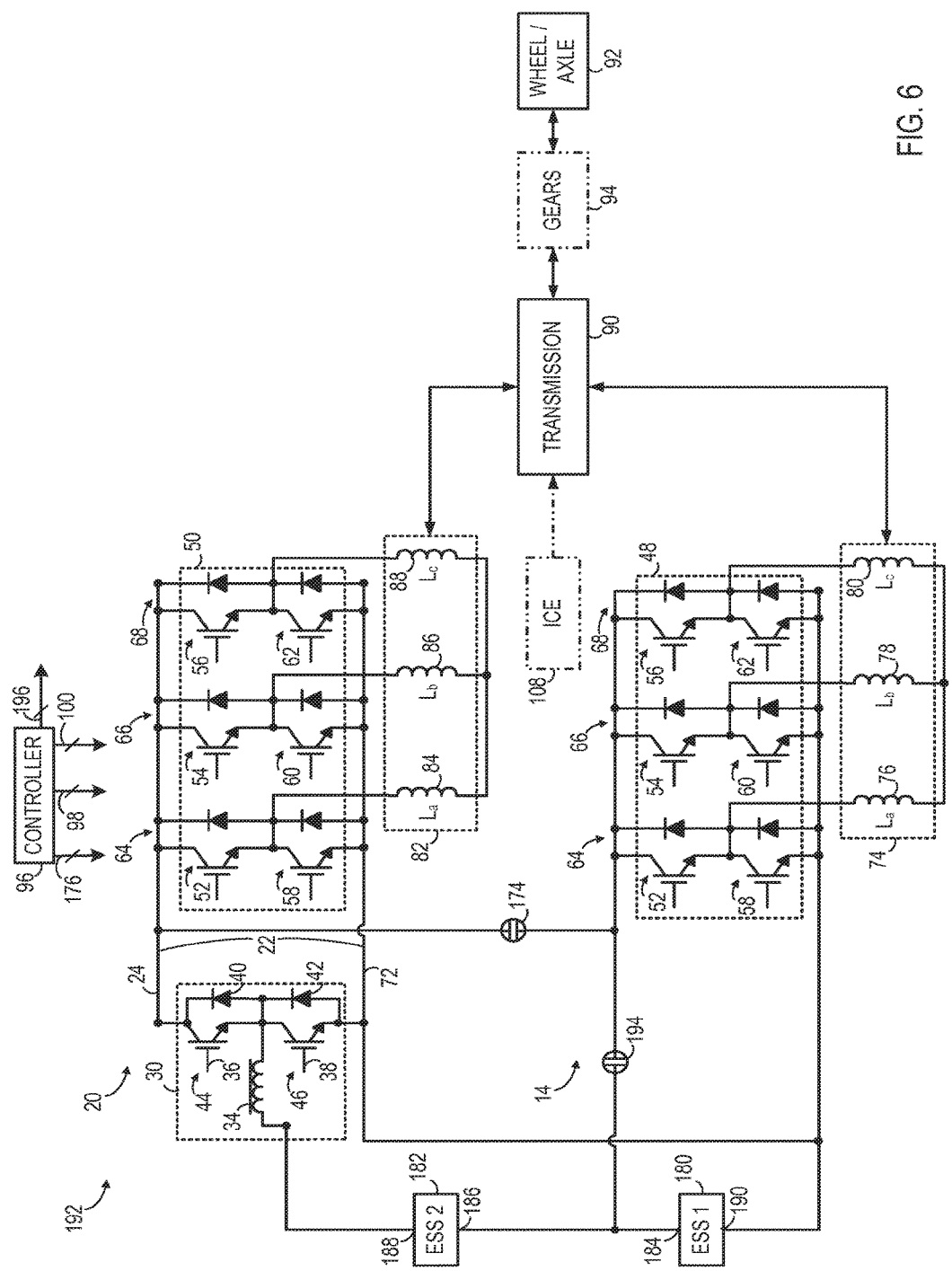
FIG. 6 is a schematic diagram of a propulsion system according to another embodiment of the invention.

FIG. 6 illustrates a propulsion system 192 according to yet another embodiment of the invention. As propulsion system 192 includes many of the same components and elements of propulsion system 178 of FIG. 5, elements and components common to systems 178 and 192 will be discussed relative to the same reference numbers as appropriate.

In addition to the components common with propulsion system 178, propulsion system 192 includes a coupling device 194 that replaces the bi-directional DC-DC voltage converter 32 of propulsion system 178 on the A channel 14 and that is controlled by controller 96 via control lines 196. Similar to coupling device 174, coupling device 194 may be constructed as an electromechanical switching device, a solid-state type switching device, a diode, a combination of a resistor and a contactor or solid-state switch, as non-limiting examples. Because coupling device 194 is a lower cost component than a bi-directional DC-DC voltage converter, propulsion system 192 may be manufactured at a lower cost than propulsion system 178 of FIG. 5. Further, because coupling device 194 operates at a higher efficiency than a bi-directional DC-DC voltage converter, replacing the A channel bi-directional DC-DC voltage converter 32 of FIG. 1 with coupling device 194 increases the overall efficiency of propulsion system 192.

Similar to propulsion system 178 of FIG. 5, propulsion system 192 includes first and second energy storage systems 180, 182 arranged in series such that positive terminal 184 of first energy storage system 180 is coupled to negative terminal 186 of second energy storage system 182. First energy storage system 180 is sized based on the desired acceleration of the propulsion system 192 whereas second energy storage system 182 is sized based on the desired distance of travel while operating using the electric drive. In the embodiment illustrated in FIG. 6, first energy storage system 180 is configured as a power battery, rather than an ultracapacitor, in order to maintain a DC link voltage for DC-to-AC voltage inverter 48 within a threshold value of a predetermined nominal voltage when coupling device 194 is closed. In addition, the nominal voltage of first energy storage system 180 is selected such that the normal operating voltage range of first energy storage system 180 is within a threshold value of the optimized DC link voltage for the A channel 14 that is determined based on the design parameters of electromechanical device 74.

Figure 7:
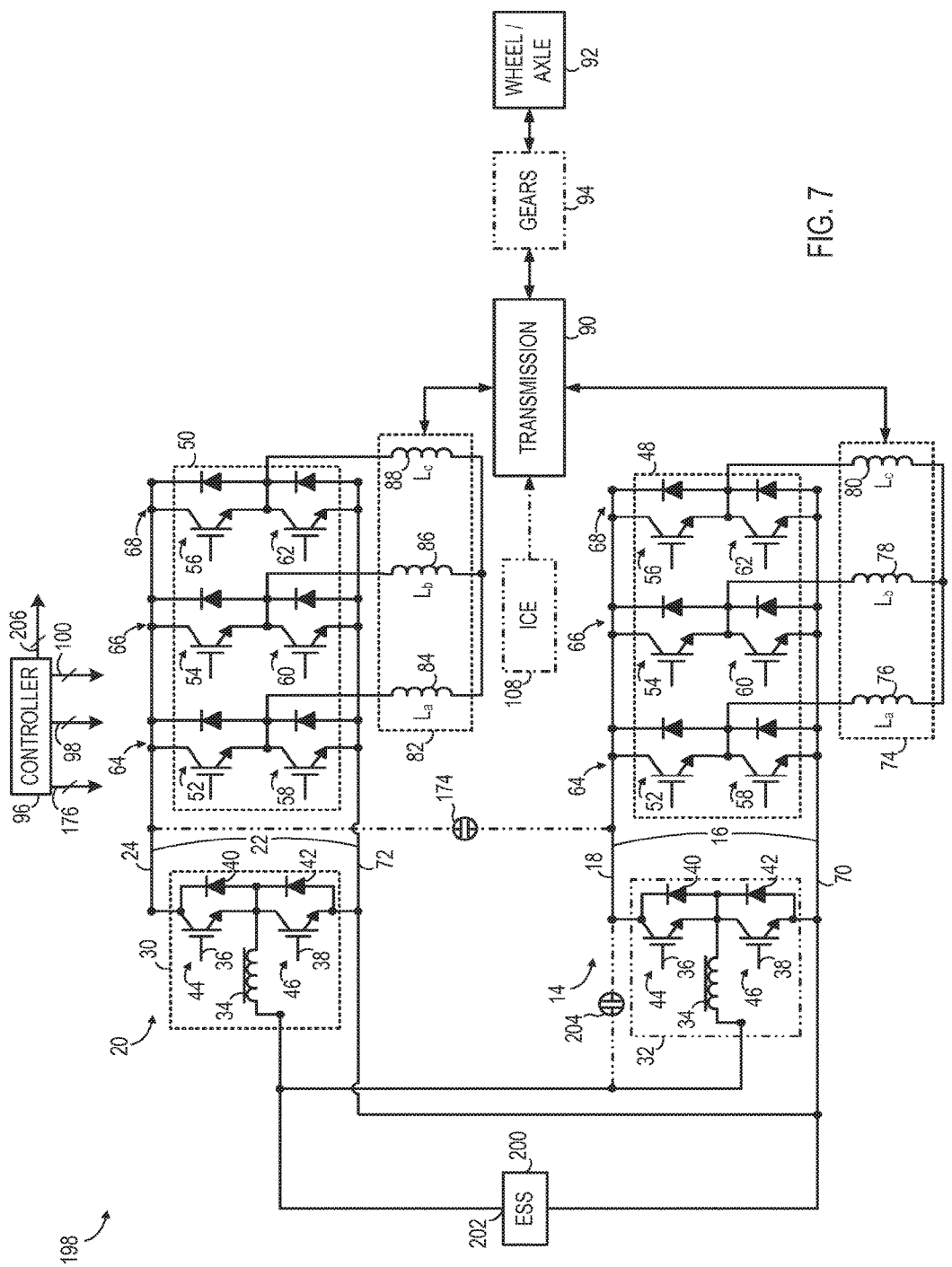
FIG. 7 is a schematic diagram propulsion system according to another embodiment of the invention.

Referring to FIG. 7, a dual-channel propulsion system 198 is shown according to yet another embodiment. Elements common to propulsion systems 10, 198 are referred to with similar numbering. Similar to propulsion system 10 of FIG.

1, propulsion system 198 includes a single energy storage system 200 coupled to both the A channel 14 and the B channel 20. Similar to energy storage system 12 (FIG. 1), energy storage system 200 may be a high-voltage or high-power energy storage device and may be a battery, a flywheel system, fuel cell, an ultracapacitor, or a combination of ultracapacitors, fuel cells, and/or batteries, according to various embodiments. As shown, the positive terminal 202 of energy storage system 200 is coupled to B channel positive DC link 24 through first bi-directional DC-DC voltage converter 30. The A channel positive DC link 18 is coupled to the positive terminal 202 of through second bi-directional DC-DC voltage converter assembly 32.

An optional bypass contactor 204 (shown in phantom) is included on the A channel 14 between energy storage system 200 and DC-to-AC voltage inverter 48. According to various embodiments, bypass contactor 204 may be constructed as an electromechanical switching device, a solid-state type switching device, a diode, a combination of a resistor and a contactor or solid-state switch, as non-limiting examples.

In one embodiment, energy storage system 200 is sized such that positive terminal 202 of energy storage system 200 may be directly coupled to A channel positive DC link 18 through an optional bypass contactor. Alternatively, an optional bi-directional DC-DC voltage converter assembly 32 (shown in phantom) is coupled to the A channel DC bus 16. In this embodiment, at least one of optional DC-DC converter 32 or optional bypass contactor 204 is utilized.

Controller 96 is connected to bypass contactor 204 via control lines 206. In certain operating modes controller 96 operates bypass contactor 204 in an open state, thereby creating a power flow path between energy storage system 200 and DC-to-AC voltage inverter 48 that travels through optional bi-directional DC-DC voltage converter assembly 32, which is controlled by controller 96 to boost the voltage of energy storage system 200 to the voltage of the A channel DC bus 16. In other operating modes, controller 96 operates the optional bypass contactor 204 in a closed state to create a power flow path between energy storage system 200 and DC-to-AC voltage inverter 48 that bypasses optional bi-directional DC-DC voltage converter assembly 32. When bypass coupling device 204 is operated in a closed state to bypass bi-directional DC-DC voltage converter assembly 32, propulsion system 198 experiences an improvement in efficiency over simply turning off chopping because the losses in bi-directional DC-DC voltage converter assembly 32 are eliminated.

As described above, embodiments of the invention utilize a multi-channel DC bus assembly configured to permit the individual DC bus channels to operate either at a common voltage or at different voltages while being connected to one or multiple common energy storage systems. In some embodiments, the outputs of electromechanical devices coupled to respective channels of the DC bus assembly are coupled together through a common transmission assembly, such as an electrically variable transmission. Together, the electromechanical devices, DC-AC inverters, and bi-directional DC-DC converters associated with each channel of the multi-channel DC bus assembly along with the energy storage system(s) operate over a wide range of bi-directional speed, torque, and power that may be controlled to minimize power loss and maintain a high degree of overall system efficiency when the energy storage system(s) are operating in charge depleting and charge sustaining modes. Optionally, a heat engine may be coupled to the transmission assembly to maintain charge on the energy storage system(s) and an output of one or more of the DC bus channels may be coupled to an auxiliary load. Beneficially, the propulsion systems disclosed herein enable the energy storage system (s) to be designed to minimize size, weight, and cost while providing improved efficiency through independent control of the DC link voltage on each of the DC bus channels of the multi-channel DC bus assembly.

A technical contribution for the disclosed apparatus is that it provides for a controller implemented technique for boosting a voltage of an energy storage system to a boosted voltage and supplying the boosted voltage to a voltage bus.

According to one embodiment of the invention, an apparatus includes a multi-channel DC bus assembly comprising a first channel and a second channel, a first electromechanical device coupled to a positive DC link of the first channel, and a second electromechanical device coupled to a positive DC link of the second channel. A first DC-to-AC voltage inverter is coupled to the positive DC link of the first channel and a second DC-to-AC voltage inverter is coupled to the positive DC link of the second channel. The apparatus further includes a bi-directional voltage modification assembly coupled to the positive DC link of the second channel and a first energy storage system electrically coupled to the first electromechanical device.

In accordance with another embodiment of the invention, a method of fabricating a propulsion system includes coupling a first DC-to-AC voltage inverter to a first voltage bus, coupling a first electromechanical device to the first DC-to-AC voltage inverter, and coupling a second DC-to-AC voltage inverter to a second voltage bus. The method also includes coupling a second electromechanical device to the second DC-to-AC voltage inverter, coupling a bi-directional DC-DC voltage converter to the second voltage bus, coupling a first energy storage system to the bi-directional DC-DC voltage converter, and programming a controller to control switching of the bi-directional DC-DC voltage converter to boost a voltage of the first energy storage system to a boosted voltage different from a voltage of the first voltage bus.

In accordance with yet another embodiment of the invention, a vehicle propulsion system includes a DC bus assembly having a first DC bus and a second DC bus. The vehicle propulsion system also includes a first bi-directional DC-to-DC voltage converter coupled to the first DC bus, a high specific-power energy storage device coupled to a low voltage side of the first bi-directional DC-to-DC voltage converter, a first electromechanical device coupled to the first DC bus through a first DC-to-AC voltage converter, and a second electromechanical device coupled to the second DC bus through a second DC-to-AC voltage converter. A controller is programmed to control the first bi-directional DC-to-DC voltage converter to boost a voltage of the first electromechanical device to a boosted voltage and supply the boosted voltage to the first DC bus, the boosted voltage different than a voltage of the second DC bus.

In accordance with yet another embodiment of the invention, a vehicle propulsion system includes a first electromechanical device coupled to a positive DC link of a first DC bus, an auxiliary load coupled to an output of the first electromechanical device and a first DC-to-AC voltage inverter coupled to the positive DC link of the first DC bus. A second electromechanical device is coupled to a positive DC link of a second DC bus and a transmission is coupled to an output of the second electromechanical device. The vehicle propulsion system also includes a second DC-to-AC voltage inverter coupled to the positive DC link of the second DC bus, an energy storage system electrically coupled to the positive DC link of the second DC bus, and a bi-directional voltage modification assembly coupled to the positive DC link of the second DC bus and configured to boost a voltage of the first energy storage system to a voltage different from a voltage of the first DC bus.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for a hybrid electric vehicle, comprising:
an energy storage system;
a bi-directional DC/DC converter coupled to the energy storage system;
a first traction motor coupled to the bi-directional DC/DC converter;
a second traction motor coupled to the bi-directional DC/DC converter;
a transmission device coupled to the first traction motor, the transmission device configured as an electrically variable transmission (EVT) that comprises an arrangement of planetary gears;
a gear assembly coupled between the second traction motor and the transmission device such that the output of the second traction motor bypasses the transmission device;
an internal combustion engine coupled to the transmission device via a path that does not include the first traction motor and second traction motor; and
a control system configured to selectively:
operate the first traction motor and second traction motor to drive the vehicle through the transmission device and gear assembly, respectively; and
operate the first traction motor as a generator to generate electrical power while operating the second traction motor to drive the vehicle through the gear assembly.

2. The system of claim 1, wherein the energy storage system comprises a battery.

3. The system of claim 1, further comprising a second energy storage system coupled to the bi-directional DC/DC converter.

4. The system of claim 3, wherein the first energy storage system comprises at least one of an ultracapacitor and a power battery, and the second energy storage system comprises an energy battery.

5. The system of claim 1, further comprising a bypass coupling device configured to selectively couple the energy storage device to the first traction motor to bypass the bi-directional DC/DC converter.

6. The system of claim 1, further comprising a wheel/axle assembly coupled to the gear assembly.

7. The system of claim 1, further comprising:
a first inverter coupled between the bi-directional DC/DC converter and first traction motor; and
a second inverter coupled between the bi-directional DC/DC converter and second traction motor.

8. The system of claim 7, wherein the first traction motor is an AC motor and the second traction motor is an AC motor.

9. The system of claim 1, wherein the electrical power generated by the first traction motor is provided to the energy storage system.

10. The system of claim 1, wherein the electrical power generated by the first traction motor is provided to the second traction motor.

11. The system of claim 1, wherein the control system is further configured to operate the second traction motor as a generator to generate electrical power.

12. The system of claim 11, wherein the electrical power generated by the second traction motor is provided to the energy storage system.

13. A vehicle propulsion system, comprising:
an energy storage system;
a bi-directional DC/DC converter coupled to the energy storage system, the bi-directional DC/DC converter coupled to both a first DC bus and a second DC bus of a DC bus assembly;
a first traction drive system coupled to the first DC bus, the first traction drive system comprising a first inverter coupled to a first electric motor;
a second traction drive system coupled to the second DC bus, the second traction drive system comprising a second inverter coupled to a second electric motor;
a transmission device coupled to the first traction drive system, the transmission device configured as an electrically variable transmission (EVT) that comprises an arrangement of planetary gears;
a gear assembly coupled between the second traction drive system and the transmission device such that the output of the second traction motor bypasses the transmission device;
an internal combustion engine coupled to the transmission device via a path that does not include the first electric motor and second electric motor; and
a control system configured to selectively:
operate the first traction drive system and second traction drive system to drive the vehicle through the transmission device and gear assembly, respectively; and
operate the first traction drive system to generate electric power while operating the second traction drive system to drive the vehicle through the gear assembly.

14. The system of claim 13, wherein the energy storage system comprises a battery.

15. The system of claim 13, further comprising a second energy storage system coupled to the bi-directional DC/DC converter.

16. The system of claim 13, further comprising a wheel/axle assembly coupled to the gear assembly.

17. The system of claim 13, wherein the electrical power generated by the first traction drive system is provided to the energy storage system.

18. The system of claim 13, wherein the electrical power generated by the first traction drive system is provided to the second traction drive system.

19. A hybrid electric vehicle propulsion system, comprising:
an energy storage system;
a buck/boost converter coupled to the energy storage system;
a first inverter coupled to the buck/boost converter;
a second inverter coupled to the buck/boost converter;

a first AC motor coupled to the first inverter;
a second AC motor coupled to the second inverter;
a transmission device coupled to the first AC motor, the transmission device configured as an electrically variable transmission (EVT) that comprises an arrangement of planetary gears;
a gear assembly coupled between the second AC motor and the transmission device such that the output of the second AC motor bypasses the transmission device;
an internal combustion engine coupled to the transmission device via a path that does not include the first AC motor and second AC motor; and
a control system configured to selectively:
   operate the first AC motor and second AC motor to drive the vehicle through the transmission device and gear assembly, respectively; and
   operate the first AC motor as a generator to generate electrical power while operating the second AC motor to drive the vehicle through the gear assembly.

20. A hybrid electric vehicle propulsion system, comprising:
an energy storage system;
a buck/boost converter coupled to the energy storage system;
a first inverter coupled to the buck/boost converter;
a second inverter coupled to the buck/boost converter;
a first AC motor coupled to the first inverter;
a second AC motor coupled to the second inverter;
a transmission device coupled to the first AC motor, the transmission device configured as an electrically variable transmission (EVT) that comprises an arrangement of planetary gears;
a gear assembly coupled between the second AC motor and the transmission device such that the output of the second AC motor bypasses the transmission device;
an internal combustion engine coupled to the transmission device; and
a control system configured to selectively:
   operate the first AC motor and second AC motor to drive the vehicle through the transmission device and gear assembly, respectively; and
   operate the first AC motor as a generator to generate electrical power while operating the second AC motor to drive the vehicle through the gear assembly.

* * * * *